United States Patent [19]

Perron et al.

[11] Patent Number: 5,140,621
[45] Date of Patent: Aug. 18, 1992

[54] METHOD OF ENCODING AND DECODING DATA IN BLOCKS, AND ENCODING AND DECODING DEVICES IMPLEMENTING THIS METHOD

[75] Inventors: Claude Perron; Philippe Tourtier, both of Rennes, France

[73] Assignee: Thomson CSF, Puteaux, France

[21] Appl. No.: 457,767

[22] PCT Filed: Apr. 14, 1989

[86] PCT No.: PCT/FR89/00169
§ 371 Date: Feb. 9, 1990
§ 102(e) Date: Feb. 9, 1990

[87] PCT Pub. No.: WO89/10042
PCT Pub. Date: Oct. 19, 1989

[30] Foreign Application Priority Data
Apr. 15, 1988 [FR] France ................... 88 05021

[51] Int. Cl.⁵ ................................ H04L 1/66
[52] U.S. Cl. ............................. 375/122; 358/133
[58] Field of Search ............. 375/27, 33, 122; 358/133, 135, 136, 138

[56] References Cited
U.S. PATENT DOCUMENTS

| | | | |
|---|---|---|---|
| 4,365,273 | 12/1982 | Yamada et al. | 358/133 |
| 4,694,336 | 9/1987 | Kessen et al. | 358/133 |
| 4,821,119 | 4/1989 | Gharavi | 358/136 |
| 4,833,535 | 5/1989 | Ozeki et al. | 375/27 |
| 4,873,573 | 10/1989 | Thomas et al. | 358/133 |

Primary Examiner—Stephen Chin
Attorney, Agent, or Firm—Cushman, Darby & Cushman

[57] ABSTRACT

The present invention relates to a method and apparatus of encoding and decoding blocks of data words. Each block has a fixed number of data words with a maximum of n bits, and a position of a data word within a block is diagonally identified by a series of absolute addresses having consecutive values. In the encoding of the data words of a block, the data words are classified into groups based on their most significant non-zero bit. Then the corresponding absolute address of each classified data word is encoded based on the absolute address of a previously encoded data word in the same class as the current classified data word and the number of data words encoded in classes less than the current classified data word since the previous encoding of a data word in the class of the current classified data word. Each data word with its ith and greater bits omitted is then transmitted along with the encoded absolute address. The encoded data words are decoded by determining the class of each encoded data word and storing, class by class, the encoded data words and their corresponding encoded addresses. The ith and greater bits of each encoded data words are reconstituted, and the encoded absolute addresses of each data word are then reconstituted into absolute addresses to reconstitute a block of data words.

10 Claims, 6 Drawing Sheets

VALUES TO BE ENCODED

ORDER OF SCANNING

ABSOLUTE ADDRESSES

FIG. 4a.

CLASS N°1

FIG. 4b.

CLASS N°2

FIG. 4c.

CLASS N°3

METHOD OF ENCODING AND DECODING DATA IN BLOCKS, AND ENCODING AND DECODING DEVICES IMPLEMENTING THIS METHOD

BACKGROUND OF THE INVENTION

1. Field of the Invention

The invention relates to a method of encoding and decoding data in blocks, each block being constituted by a fixed number of data words each comprising a maximum of n bits; and relates to an encoding device and a decoding device implementing this method.

2. Description of the Related Art

The blocks can for example be tables of 8×8 or 16×16 cosine transformation coefficients resulting from the encoding of the series of images by the cosine transformation. Such a table comprises numerous zero coefficients. The non-zero coefficients have probabilities of appearance which decrease as a function of the absolute value of the coefficients. Conventionally, these coefficients are encoded using a variable length encoding, such as a Huffman encoding which consists in representing by shorter code words the coefficients having the highest probabilities of appearance. A Huffman encoding is efficient if there is a great difference between the probabilities of appearance of the most frequent values and those of the least frequent values. On the other hand, this type of encoding is not efficient for encoding words which have probabilities of appearance which are not very different.

Another type of variable length encoding is described in Picture Coding Symposium PCS86, Tokyo, Japan 2-4 Apr. 1986, pages 148-149; and consists in:

reorganizing the series of data words constituting each block by classifying the words in n classes No i, for i=1 to n, the class No i grouping all of the words having i significant bits;

transmitting the words of non-zero value, of each class No i for i=1 to n successively, omitting to transmit the most significant bit, and each transmitted word being accompanied by an address marking the position of the word in its block. This address is a relative address computed by subtracting from the absolute address of the word to be encoded the absolute address of the last word having been previously encoded in the same class as the word to be encoded. Then this relative address is encoded by a Huffmann encoding.

The decoding successively consists, for each class No i, for i=1 to n, and for each transmitted data word, in:

reconstituting the most significant bit;

deriving the absolute address of each transmitted data word from its encoded address;

and consists in reconstituting the block of data words from the transmitted words thus reconstituted, and from their absolute addresses, by inserting words of zero value at the absolute addresses for which no word has been transmitted.

SUMMARY OF THE INVENTION

The object of the invention is to propose an encoding method perfecting this known method, in order to further reduce the amount of transmitted data. The object of the invention is a method consisting in encoding the absolute addresses marking the position of the data words in a block by computing a relative address, as in the known method, and then in reducing the value of this relative address by subtracting from it a number which is less than the value of the relative address and which can be determined, at the moment of decoding, without having to transmit it.

An advantage of this method is a reduction in the quantity of data to be transmitted by reducing the value of the relative addresses; and that it can be implemented by means of a simple device which is able to operate in real time for conventional television images. The average length of the code words obtained by this method is close to the theoretical minimum number in the case in which the data words to be transmitted have a dispersed statistical distribution.

According to the invention, a method for encoding and decoding blocks of data words, each block having a fixed number of data words with a maximum of n bits, a position of a data word within a block being marked diagonally by a series of absolute addresses having consecutive values. The encoding data words for transmission comprising the steps of: classifying data words into n classes, an ith class, where i=1 to n, groups data words having as their most significant non-zero bit their ith bit; computing a relative address for each classified data word by subtracting from an absolute address of a classified data word an absolute address of a data word in the class of the classified data word previously encoded; determining a transmitted address for each classified data word by subtracting from its relative address a number of data words in classes less than the class of the classified data word which have been encoded since a previous encoding of a data word in the class of the classified data word, thereby encoding the classified data word; and transmitting class by class and in an order of increasing absolute addresses within each class, encoded data words and their corresponding transmitted addresses, the encoded data words of each ith class having their ith and greater bits omitted from transmission, the transmitted addresses being encoded according to a variable length code. The decoding of the transmitted encoded data words to reconstitute the blocks of data words comprising the steps of: determining the class of an encoded data word; storing class by class the encoded data words and corresponding transmitted addresses; reconstituting the ith and greater bits of each encoded data word to reconstitute the value each encoded data word; reconstituting an absolute address of each encoded data word from its transmitted address. The step of reconstituting an absolute address comprising the steps of: computing a hypothetical relative address for an encoded data word, in each class, which is to be decoded next, the hypothetical relative address of an encoded data word to be decoded is computed by adding the transmitted address of an encoded data word to be decoded to the number of encoded data words in classes less than the class of the encoded data word to be decoded which have been decoded since a previous decoding of an encoded data word in the class of the encoded data word to be decoded; computing a hypothetical absolute address for an encoded data word, in each class, which is to be decoded next, the hypothetical absolute address of an encoded data word to be decoded is computed by adding the hypothetical relative address of an encoded data word to be decoded to the absolute address of an encoded data word in the class of the encoded data word to be decoded previously decoded; and selecting a hypothetical absolute address having a minimum value from the hypothetical absolute addresses of the encoded data word in each class to be decoded next as the reconstituted absolute address. Then the decoding is completed by reconstituting a block of data words based on the reconstituted values of encoded data words and their corresponding reconstituted absolute addresses, and by inserting zero value data words at absolute addresses in the block having no corresponding reconstituted encoded data word.

BRIEF DESCRIPTION OF THE DRAWINGS

The invention will be better understood and other details will appear with the help of the following description and of the accompanying figures in which:

Figures 4A, 4B, 4C:
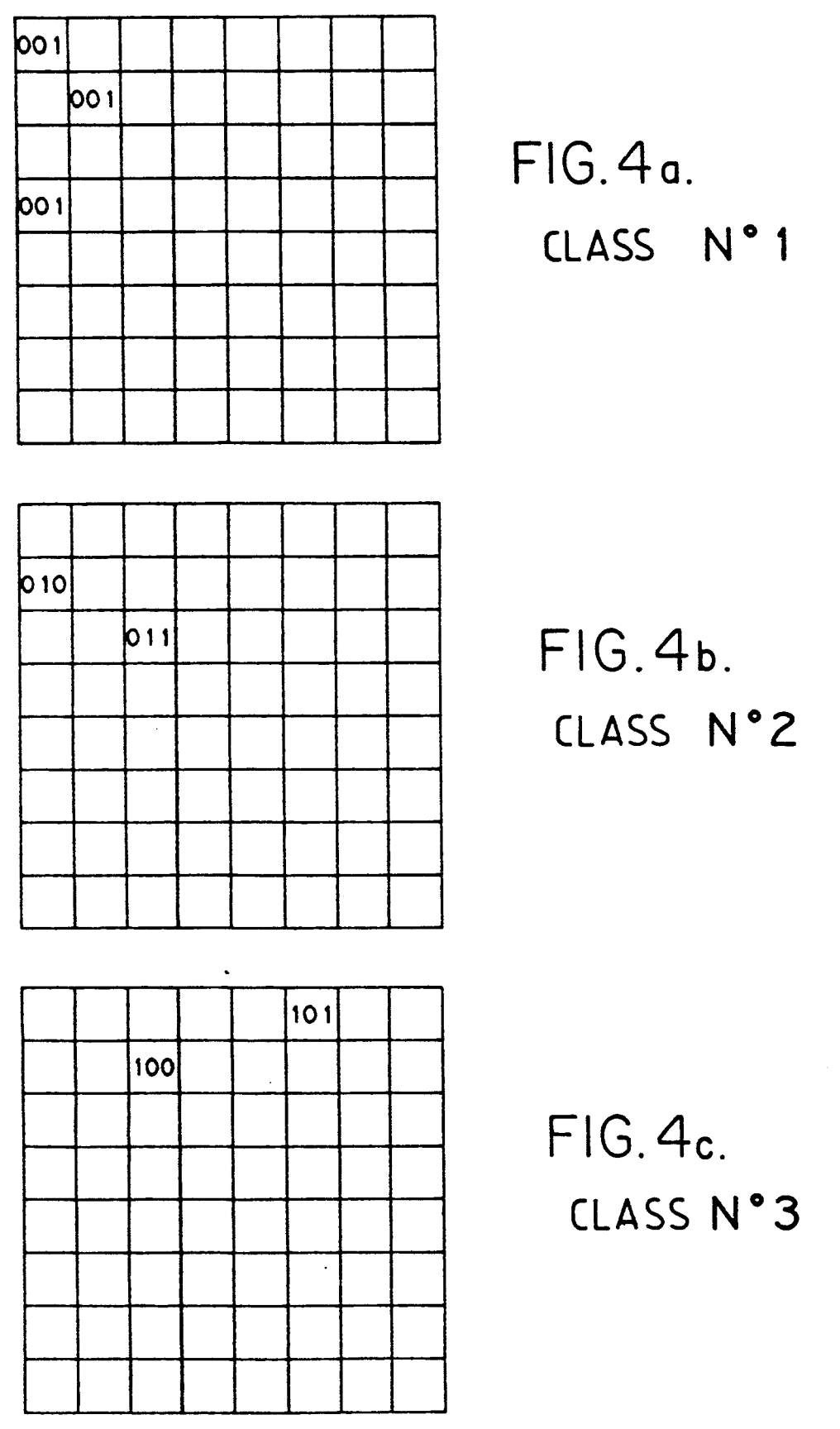

FIGS. 4, and 4a-4c show the distribution of the transformation coefficients of the block in FIG. 1, in three classes: No 1, No 2, No 3;

DETAILED DESCRIPTION OF THE PREFERRED EMBODIMENTS

Figures 1, 2, 3:
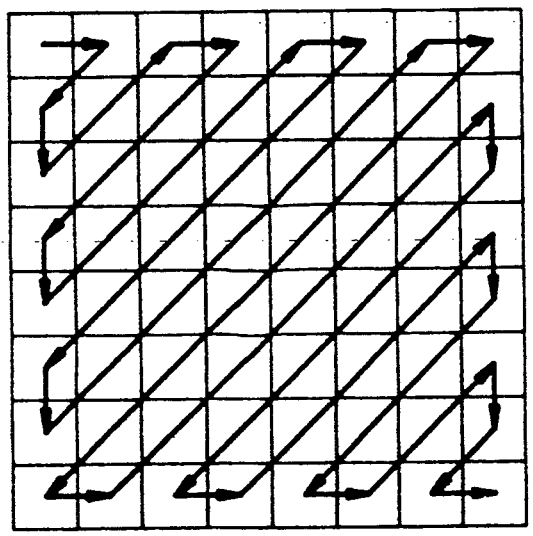
FIG. 1 shows an example of the block of $8 \times 8$ cosine transformation coefficients to be encoded by the method according to the invention.
FIG. 2 shows the order of scanning for defining a series of consecutive absolute addresses marking the positions of the transformation coefficients in the block.
FIG. 3 shows a table of absolute addresses of transformation coefficients in the block.

The block of data words to be encoded, shown in FIG. 1, is a block of $8 \times 8$ cosine transformation coefficients resulting from the transformation of a block of $8 \times 8$ picture elements. The zero values are represented by blanks. The coefficients located at the top left of the table correspond to the low spatial frequencies of the image while the coefficients at the bottom right correspond to the high spatial frequencies and generally have zero values. The coefficients are considered in succession along a predetermined scanning path which enables them to be successively processed as if it were a table having a single dimension. In order for the series of coefficients to end in a long sequence of zero values, the chosen scanning path has a zigzag shape such as shown in FIG. 2.

FIG. 3 shows the table of absolute addresses of the transformation coefficients in FIG. 1, scanned in the scanning order shown in FIG. 2.

In this example the words to be encoded have a maximum of three bits. A first step of the method according to the invention consists in classifying the coefficients in three classes: No 1, No 2, and No 3, respectively grouping the coefficients having as their most significant non-zero bit their first, second, and third bit respectively. Each of these classes can be represented by a table of dimensions $8 \times 8$. FIGS. 4, and 4a-4c show classes No 1, No 2 and No 3.

The non-zero coefficients are transmitted in clear, class after class, in the order of increasing numbers while omitting the transmission of the most significant non-zero bit and greater bits since it is the same for all of the coefficients in a same class. Since the non-zero coefficients are not transmitted, it is necessary to transmit an address marking the position of each coefficient which is transmitted. In order to reduce the quantity of transmitted data, it can be considered to encode this address using a Huffman encoding. But in order for the Huffmann encoding to be efficient the absolute addresses must not be transmitted as they are all different from each other, which prevents any efficiency in the Huffmann encoding. A relative address obtained by computing the difference between the absolute address of the coefficients to be transmitted and the absolute address of the previously transmitted coefficient has the advantage of becoming smaller as the two considered coefficients become closer in the block. But it is possible to further improve the encoding of addresses by reducing the value of the relative address in order to reduce the quantity of data to be transmitted.

For this purpose the method according to the invention consists in reducing the value of the relative address by subtracting from this relative address the number of coefficients having been encoded in all other classes having a number less than that of the class of the coefficient to be encoded, between the instant considered and the instant at which the coefficient whose address is used as a reference for computing the relative address was encoded i.e., since the encoding of the last coefficient having been previously encoded in the same class as the coefficient to be encoded.

When all of the coefficients of a class have been encoded, the method then consists in successively encoding the coefficients of non-zero value belonging to the next class, the classes being considered in the order of increasing numbers which also corresponds to coefficients having an increasing number of the most non-zero bit. As will appear in the rest of the description of this example, the choice of this order of priority for the successive encoding of the classes enables a more efficient reduction of the relative address values because the classes of low number contain a larger number of non-zero coefficients than the classes of high number.

Figure 5:
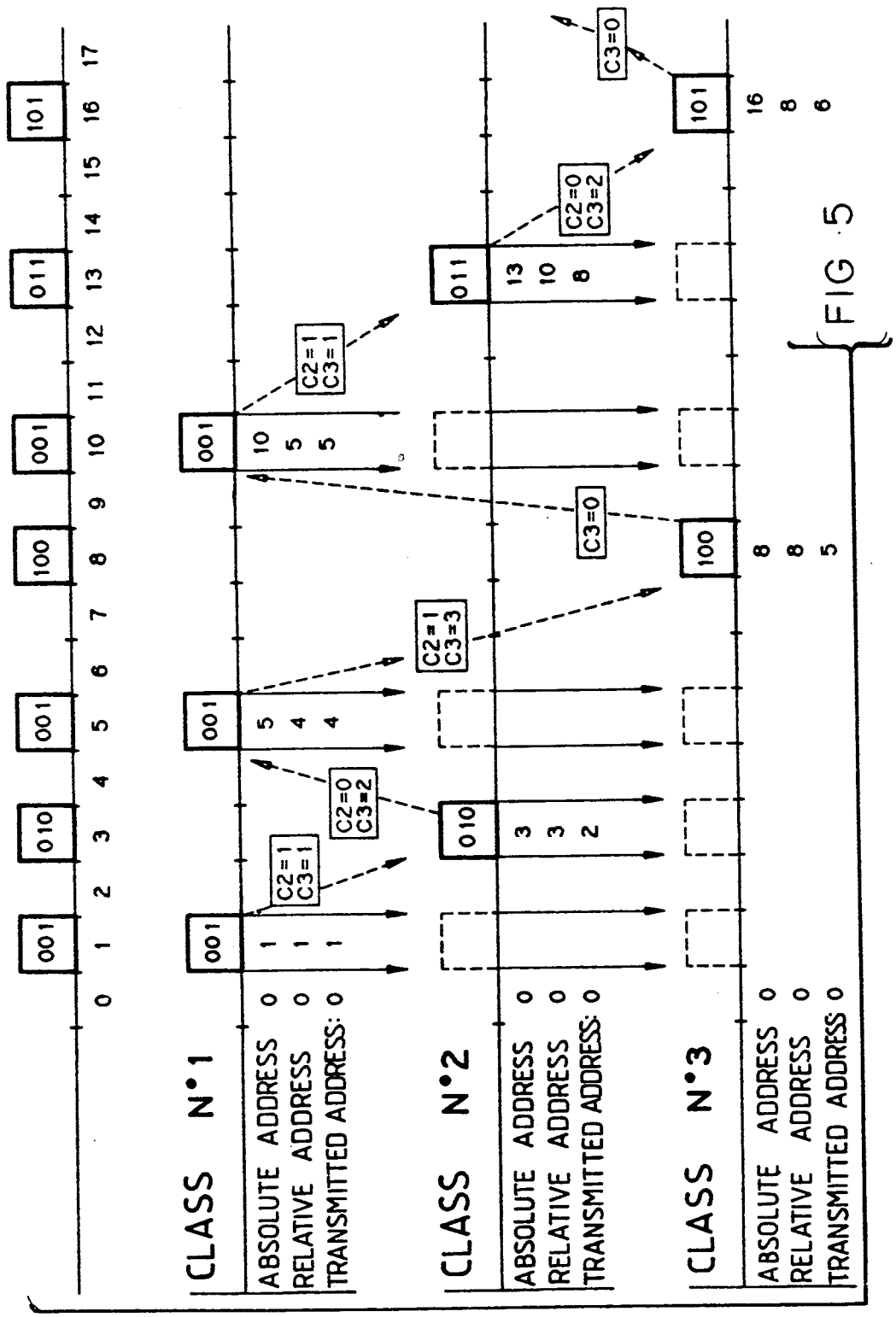
FIG. 5 shows the various steps in the encoding of the transformation coefficients in this example.

FIG. 5 illustrates the encoding of this example of a block of $8 \times 8$ coefficients. The first line represents the series of its coefficients and their respective absolute addresses, when they are scanned in the order shown in FIG. 2. The second line shows the coefficients belonging to class No 1. These coefficients have as their most significant non-zero bit their first bit. The fist bit is the only bit having a value, 001. The third line shows the coefficients of class No 2. The fourth line shows the coefficients of class No 3. Below each coefficient are successively shown: the value of its absolute address; the value of its relative address with respect to the last coefficient previously encoded in the same class; and finally the value of its transmitted address, which is computed on the basis of the relative address shown above.

The dotted line arrows represent the order in which the coefficients are successively encoded. This order corresponds to the order of increasing absolute addresses. An absolute address 0, imaginary has been added to enable the computation of a relative address and a transmitted address for the coefficient having an absolute address equal to 1, using the same method of computation as for the other coefficients.

By the construction of the classes, a coefficient only belongs to one class. In the other classes, the same absolute address does not contain a coefficient.

In FIG. 5, the dotted squares represent information derived from the fact that a non-zero coefficient exists in a class having a lower number than that of the class at which the dotted square is shown. This information is used for reducing the value of each relative address and to obtain a transmitted address for a coefficient of the class where the dotted square is shown. Conversely, this data is used on decoding in order to retrieve the relative address from the transmitted address before deriving the absolute address from it.

For example the presence of the coefficient 001 at the absolute address 1 in the class No 1 enables it to be affirmed that there is certainly an absence of coefficient at the absolute address 1 in the class No 2 and in the class No 3. Similarly, the presence of the coefficient 010 at the absolute address 3 in the class No 2 enables it to be affirmed that there is certainly an absence of coefficient at the absolute address 3 in the class No 3 in particular. Similarly, the presence of the coefficient 001 at the absolute address 5 in the class No 1 enables it to be affirmed that there is certainly an absence of coefficient in the class No 2 and the class No 3 at the absolute address 5.

These absences of coefficient are known by the decoder without having to transmit them. The method according to the invention exploits these redundant data. For example, during the encoding of the coefficient 100, at the absolute address 8 in the class 3, the relative address of this coefficient is also equal to 8, as there have been no other non-zero coefficients previously encoded in this class. This relative address can be reduced by three units, corresponding to the three dotted squares, from the moment at which it is otherwise known that there are these 3 empty addresses in this class No 3, between the absolute address 0 and the absolute address 8.

In order to be able to compute the transmitted address of a non-zero coefficient in this way, it is necessary to know the number of non-zero coefficients having been encoded in the classes of number lower than that of the considered class, between the instant considered and the instant at which the previous non-zero coefficient in the same class was encoded. The method consists in taking into account the values of two variables C2 and C3 which count respectively in the classes No 2 and No 3 the number which can be subtracted from the relative address of the next coefficient to be encoded. C2 is the content of a counter which is reset to zero each time that a non-zero coefficient is encoded in the class No 2 and which is incremented each time that a non-zero coefficient in the class No 1 is encoded. C3 is the content of a counter which is reset to zero each time a non-zero coefficient is encoded in the class No 3 and which is incremented by unity each time that a non-zero coefficient is encoded in the class No 1 or in the class No. 2. As a general rule the counter of the class No i is reset to zero when a non-zero coefficient of the class No i is encoded and it is incremented by unity each time that a non-zero coefficient is encoded in one of the classes having a number strictly less than i. Naturally, there is no variable C1 corresponding to the class No 1, since there is no class having a number less than 1. Furthermore, in the class No 1 each transmitted address is equal to the corresponding relative address.

FIG. 5 shows the evolution of the values C2 and C3 during the encoding of each of the non-zero coefficients along the path represented by the dotted arrows. For example, the value C3 is incremented during the encoding of the coefficient 001 located at the absolute address 1 and belonging to the class No 1; and then is incremented during the encoding of the coefficient 010 located at the absolute address 3 and belonging to the class No 2; and then is incremented during the encoding of the coefficient 001 located at the absolute address 5 and belonging to the class No 1. The value C3 is reset to zero during the encoding of the value 100 located at the absolute address 8 and belonging to the class No 3, after the value 3 of C3 has been used for computing the transmitted address with this coefficient.

The presence of a non-zero coefficient at a given address, in a class No i, also enables it be concluded that there is certainly an absence of coefficients at this same address in the classes having numbers strictly less than i, but this information is not used in order to reduce the value of the relative addresses, as the relative address could not be reconstituted from the transmitted address, at the moment of decoding, as will appear during the following description of the decoding.

The class No 1 corresponds to the coefficients having the lowest values: 001, which are those having the highest probability of appearance. The fact of giving priority to classes in the order No 1, No 2, No 3 etc rather than in the reverse order, enables the variables $C_i$ to reach higher values and therefore enables a high. reduction in the values of transmitted addresses, which reduces the quantity of information to be transmitted. This appears in FIG. 5: the coefficients of the class No 1 are more numerous than those of the classes No 2 and No 3, therefore their relative addresses and their transmitted addresses are smaller. Furthermore, the values C2 and C3 are relatively high, which in the figure results in a large number of dotted squares; and which results in a reduction in the values of the transmitted addresses for the classes No 2 and No 3.

In this example of implementation, the transmitted addresses are encoded with a Huffman encoding before they are transmitted. They are statistically strongly grouped in the vicinity of the value 1, which enables an efficient Huffman encoding.

The coefficients and the addresses corresponding to two separate blocks are transmitted separating them with an inter-block separator chosen such that it cannot be imitated by a licit concatenation of coefficients and addresses.

Naturally the encoded data corresponding to separate classes must be separated in order to enable, at the time of decoding, distinguishing between the coefficients belonging to the different classes. The method according to the invention comprises two variants, the first of which consists in transmitting, with the coefficients and with the addresses of each class, an inter-class separator word chosen such that it cannot be imitated by the licit concatenation of coefficients and transmitted addresses, the latter being encoded by a Huffman code. According to a second variant of the method, the latter consists in transmitting, before the coefficients and the addresses of each class, a binary word giving the number of non-zero coefficients transmitted.

The object of the decoding is to reconstitute the exact value of each coefficient and its absolute address. The reconstitution of the non-zero coefficients is very simple since it suffices to add an additional significant bit to the transmitted values. On the other hand, the reconstitution of the absolute addresses from the transmitted addresses is more complex. It is described below. It then remains to reconstitute the zero coefficients by allocating a zero value to the coefficients which are located at absolute addresses for which there has been no decoding of a transmitted coefficient.

The transmitted coefficients must be decoded in the order of increasing absolute addresses, i.e. in the same order as for the encoding, but the absolute addresses are not known before their decoding.

In particular, the first coefficient to be decoded can be that transmitted first in class No 1, or that transmitted first in class No 2, or that transmitted first in class No 3.

The decoding of the non-zero coefficients has the steps of:

storing, class by class, as they are transmitted, the coefficients and their transmitted addresses, the latter having undergone a decoding which is the inverse of the Huffman encoding which they have undergone before transmission;

reconstituting the exact value of each transmitted coefficient, by reconstituting the most significant bit;

reconstituting the absolute address of each transmitted word from its transmitted address by computing a hypothetical relative address for the first coefficient not yet decoded in each class; then by computing a hypothetical absolute address for the first coefficient not yet decoded in each class equal to the sum of its hypothetical relative address and the absolute address of the last coefficient previously decoded in the class of the coefficient concerned; and by taking as a definite absolute address the hypothetical absolute address having the minimum value from among those computed for all of the classes. If there are several hypothetical absolute addresses having the same value, the hypothetical absolute address corresponding to the class having the smallest number is selected from among the classes containing coefficients having the same hypothetical absolute address.

The coefficient corresponding to the address thus selected is considered as definitively decoded and the selected address constitutes its absolute address in the block of decoded coefficients.

Figure 6:
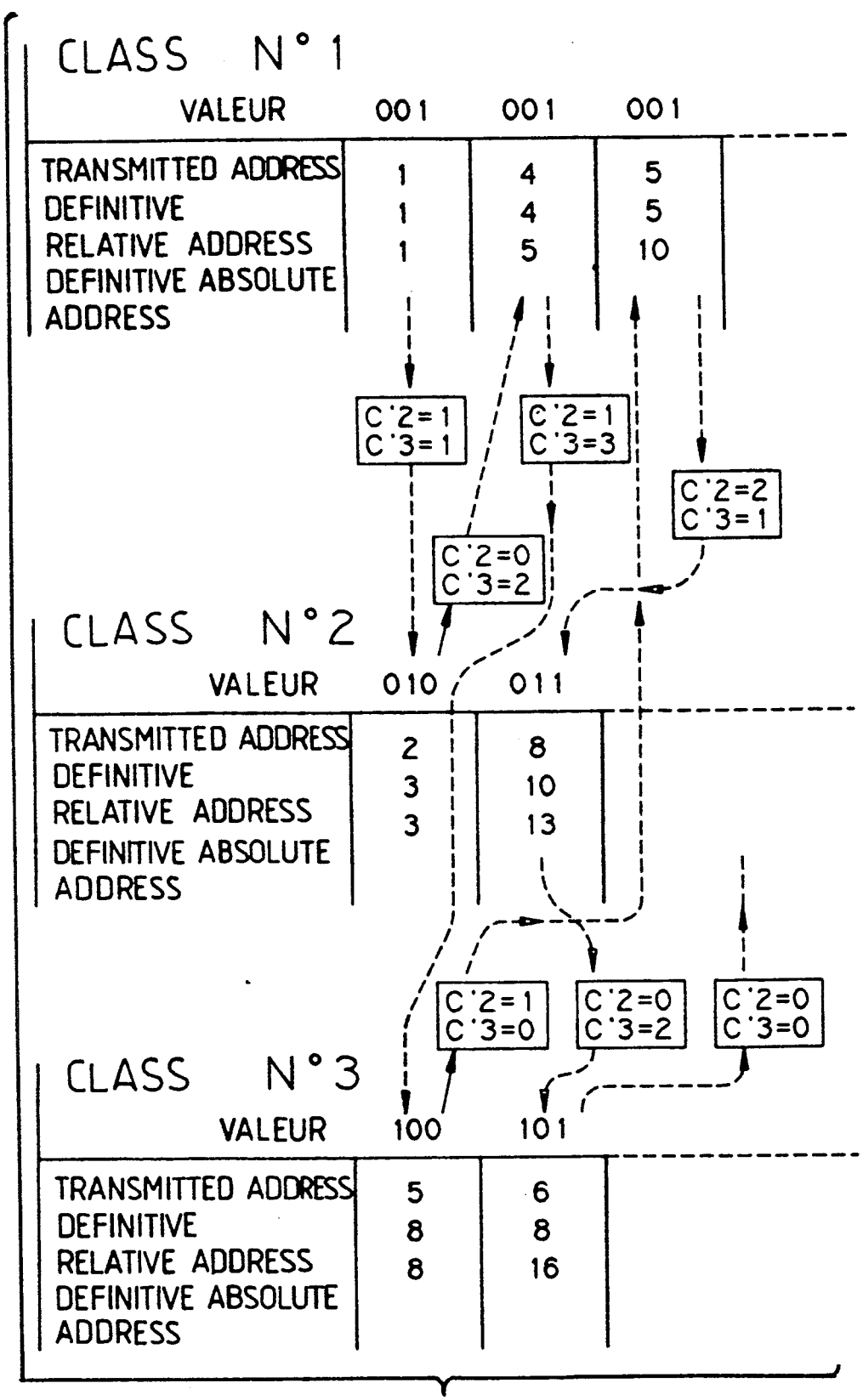
FIG. 6 shows the different steps in the decoding of the transformation coefficients in this example.

FIG. 6 illustrates an example implementation of the method according to the invention for the decoding of the blocks of cosine transformation coefficients given in FIG. 1. This figure comprises three tables respectively corresponding to the transmitted coefficients which respectively belong to the classes No 1, No 2 and No 3. These tables show, under each reconstituted coefficient: the value of its transmitted address, the value of its definitive relative address, and the value of its definitive absolute address. This figure does not therefore show the values of the hypothetical relative addresses and of the hypothetical absolute addresses which are used during the decoding in order to retrieve the original order of coefficients, which is the order of increasing absolute addresses.

The order of decoding of the coefficients is represented by dotted arrows. This figure also represents the evolution of two values: C'2 and C'3, respectively corresponding to class No 2 and class No 3 and having a similar function to that of the values C2 and C3 during the encoding. The value C'2 is reset to zero each time that a transmitted coefficient belonging to the class No 2 is decoded. It is incremented by unity each time that a coefficient of the class No 1 is decoded. The value C'3 is reset to zero each time that a transmitted coefficient belonging to class No 3 is decoded. It is incremented by unity each time that a transmitted coefficient belonging to class No 1 or to class No 2 is decoded. Naturally the values C'2 and C'3 are reset to zero at the start of decoding a block.

The decoding, in this example, firstly consists in computing a hypothetical relative address and then a hypothetical absolute address respectively for the first transmitted coefficient belonging to the class No 1, for the first transmitted coefficient belonging to the class No 2, and for the first transmitted coefficient belonging to the class No 3. The first transmitted coefficient belonging to the class No 1 has the value: 001, and the transmitted address: 1. Since there is no class having a number less than 1, the hypothetical relative address is equal to the transmitted address: 1. Since, by hypothesis, the considered coefficient is the first of the class No 1, its hypothetical absolute address is equal to its hypothetical relative address: 1. The variables C'2 and C'3 retain their initial zero values for the moment.

In the class No 2, the first transmitted coefficient has the value: 010, and the transmitted address: 2. Since the variable C'2 has been initialized at zero, the hypothetical relative address is equal to the transmitted address: 2. Since by hypothesis, the considered coefficient is the first transmitted coefficient in the class No 2, its hypothetical absolute address is equal to its hypothetical relative address: 2. For the moment, the variable C'3 retains its initial zero value.

In the class No 3, the first transmitted coefficient has the value: 100, and the transmitted address: 5. Since the variable C'3 has been initialized at zero, the hypothetical relative address is equal to the transmitted address: 5. Since, by hypothesis, the considered coefficient is the first transmitted coefficient in the class No 3, the hypothetical absolute address is equal to the hypothetical relative address: 5. The decoding then consists in selecting the smallest of these three hypothetical absolute addresses. The smallest is equal to 1 and corresponds to the coefficient of value: 001, belonging to the class No 1. Its hypothetical absolute address is then considered as definitive. This coefficient is then considered as completely decoded and the method then consists in incrementing the variables C'2 and C'3 by unity. They are then each equal to 1.

The method then consists in determining a hypothetical relative address and then a hypothetical absolute address respectively for the first transmitted coefficient which has not yet been decoded in the class No 1, in the class No 2 and in the class No 3. It should be noted that the hypothetical relative addresses and the hypothetical absolute addresses of the first coefficient of the class No 2 and of the first coefficient of the class No 3 will not be equal to those previously computed for the same coefficients as the variables C'2 and C'3 have been incremented in the meantime.

In the class No 1, the first transmitted coefficient which has not yet been decoded has the value: 001 and the transmitted address: 4. Since, in the class No 1, the relative addresses are equal to the transmitted addresses, the hypothetical relative address is equal to the transmitted address: 4. The hypothetical absolute address is equal to 5, since there has already been a decoded coefficient in the class No 1 of absolute address 1. In the class No 2, the first transmitted coefficient which has not yet been decoded has the value: 010, and the transmitted address: 2. Since the variable C'2 is equal to 1, the hypothetical relative address is equal to 3. Since there has not already been a decoded coefficient in the class No 2, the hypothetical absolute address is equal to 3. In the class No 3, the first transmitted coefficient which has not yet been decoded has the value: 100, and the transmitted address 5. Since the variable C'3 is equal to 1, the hypothetical relative address is equal to 6. Since there has not previously been a decoded coefficient in the class No 3, the hypothetical absolute address is equal to the hypothetical relative address: 6.

The decoding then consists in determining which is the hypothetical absolute address which is the smallest among these three values: 5, 3 and 6. The coefficient having the smallest hypothetical absolute address is therefore the coefficient of the value: 010, belonging to the class No 2. Its definitive absolute address is therefore equal to 3. The method finally consists in reinftializing the variable C'2 to zero and in incrementing the variable C'3 by unity giving it the value 2.

The method then consists in determining a hypothetical relative address and then a hypothetical absolute address for the first transmitted coefficient which has not yet been decoded, respectively in the class No 1, in the No 2 and in the class No 3. In the class No 1, the first transmitted coefficient not yet decoded has the value 001, and the transmitted address: 4. Its hypothetical relative address is equal to 4 and its hypothetical absolute address is equal to 5 since there has already been a decoded coefficient in the class No 1. In the class No 2, the first transmitted coefficient not yet decoded has the value: 011, and the transmitted address: 8. Its hypothetical relative address is equal to 8 since the variable C'2 is equal to zero, and its hypothetical absolute address is equal to 11, since there has already been a coefficient decoded in the class No 2 of absolute address 3. In the class No 3, the first transmitted coefficient which has not been decoded has the value: 100, and the transmitted address 5. Its hypothetical relative address is equal to 7, since the variable C'3 is equal to 2. Its hypothetical absolute address is equal to 7, since there has been no previously decoded coefficient in the class No 3.

The method then consists in determining which is the smallest hypothetical absolute address among 5, 11 and 7. The absolute address which is retained is therefore 5. The decoded coefficient is therefore the coefficient of value: 001, having the definitive absolute address: 5 and which belongs to the class No 1. The variables C'2 and C'3 are then incremented by unity and assume the values: 1 and 3 respectively.

The method then consists in determining a hypothetical relative address and then a hypothetical absolute address for the first transmitted coefficient not yet decoded respectively in the class No 1, the class No 2, and the class No 3. In the class No 1, the first coefficient not yet decoded has the value: 001 and the transmitted address: 5. Its hypothetical relative address is equal to its transmitted address: 5. Its hypothetical absolute address is equal to 10, since the previous decoded coefficient in the class No 1 has the definitive absolute address: 5. In the class No 2, the first coefficient not yet decoded has the value 011, and the transmitted address: 8. Its hypothetical relative address is equal to 9, since the variable C'2 is equal to 1. Its hypothetical absolute address is 12, since the previous decoded coefficient in the class No 2 has the definitive absolute address: 3. In the class No 3, the first coefficient not yet decoded has the value: 100, and the transmitted address: 5. Its hypothetical relative address is equal to 8, since the variable C'3 is equal to 3. Its hypothetical absolute address is equal to 8 since there has not been a previously decoded coefficient in the class No 3. The decoding then consists in selecting the smallest hypothetical absolute address from among: 10, 12 and 8. The coefficient which is decoded is therefore the coefficient of value: 100, of definitive absolute address: 8 and belonging to the class No 3. The variable C'3 is then reinitialized at zero. The variable C'2 retains its value: 1.

The method then consists in computing a hypothetical relative address and then a hypothetical absolute address for the first coefficient not yet decoded respectively in the class No 1, the class No 2 and the class No 3. In the class No 1, the first coefficient not yet decoded has the value: 001, and the transmitted address : 5. Its hypothetical relative address is equal to its transmitted address: 5. Its hypothetical absolute address is equal to 10, since the previous decoded coefficient in the class No 1 has the definitive absolute address: 5. In the class No 2, the first coefficient not yet decoded has the value: 011, and the transmitted address: 8. Its hypothetical relative address is equal to 9, since the variable C'2 has the value 1. Its hypothetical absolute address is then equal to 12, since the previous decoded coefficient has the definitive absolute address: 3. In the class No 3, the first coefficient not yet decoded has the value: 101, and the transmitted address: 6. Its hypothetical relative address is equal to 6, since variable of C'3 is zero. Its hypothetical absolute address is equal to 14, since the previous coefficient in the class No 3 has the definite absolute address: 8.

The method then consists in determining the smallest hypothetical absolute address from among: 10, 12 and 14. The coefficient which is then decoded is the coefficient of the value: 001, having the definitive absolute address: 10, and belonging to the class No 1. The variables C'2 and C'3 are incremented by unity and respectively assume the values: 2 and 1.

The decoding of the non-zero coefficients is carried out in the same way until there are no coefficients to be decoded in any of the classes.

Figure 7:
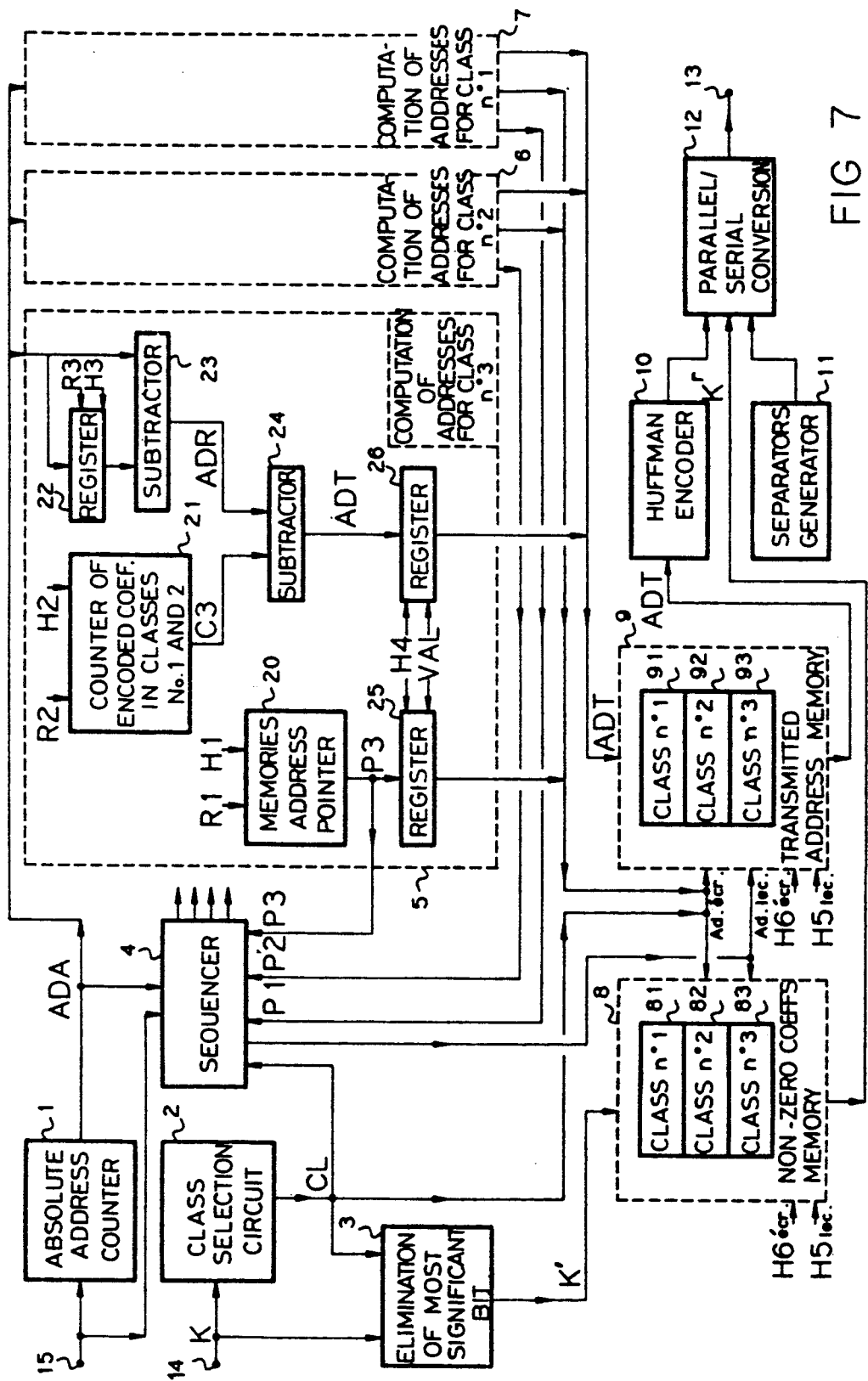
FIG. 7 shows the block diagram of an embodiment of the encoding device according to the invention.

FIG. 7 is a block diagram of an embodiment of the encoding device for the implementation of the method according to the invention. This example comprises: two input connections 14 and 15 respectively receiving a series of values of cosine transformation coefficients and a series of logic synchronization signals; an absolute address counter 1; a class selection circuit 2; a device 3 for the suppression of the most significant bit; a sequencer 4; three address computing devices 5, 6, and 7; a memory 8 called the non-zero coefficients memory; a memory 9 called the transmitted addresses memory; a Huffman encoder 10; a separator generator 11; a parallel-serial conversion device 12; and an output connection 13 supplying a series of encoded binary data.

The input connection 14 is connected to an input of the circuit 2 and to an input of the device 3. An output of the circuit 2 is connected to an input of the device 3, to an input of the sequencer 4, to two bits of a write address input common to the memory 8 and to the memory 9. These two bits select a page, 81, 82 or 83 in the memory 8 and a page 91, 92 or 93 in the memory 9. The memories 8 and 9 comprise three pages respectively corresrresponding to three classes of coefficients. The input connection 15 is connected to an input of the counter 1 and to an input of the sequencer 4. An output of the counter 1 is connected to the input of the sequencer 4 and to an input of each of the address computing devices 5, 6 and 7. First inputs of the devices 5, 6 and 7 are respectively connected to three inputs of the sequencer 4. The second inputs of the devices 5, 6 and 7 are connected to the write address input common to the memory 8 and the memory 9. The third outputs of the devices 5, 6 and 7 are connected in parallel to a data input of the memory 9.

A first output of the sequencer 4 is connected to a read address input common to the memory 8 and to the memory 9. An output of the device 3 is connected to a data input of the memory 8. An output of the memory 8 is connected to an input of the device 12. An output of the memory 9 is connected to an input of the Huffmann encoder 10. An output of the encoder 10 and an output of the separators generator 11 are respectively connected to two inputs of the device 12. An output of the device 12 constitutes the output of the encoding device and is connected to the output connection 13. The memories 8 and 9 respectively have write control inputs and read control inputs connected, by links which are not shown to outputs of the sequencer 4 and they receive the clock signals H6 and H5 respectively.

The address computing devices 5, 6, and 7 are intended to compute transmitted addresses, ADT, respectively for the coefficients of the three classes. They also compute write addresses referenced P3, P2 and P1 respectively, for writing the non-zero coefficients and their transmitted addresses in the three pages of the memories 8 and 9. These three devices are produced in a similar way. For example, the device 5 for computing addresses for the class No 3 comprises: a memories addresses pointer 20, a counter 21 of the coefficients encoded in classes No 1 and No 2, two subtracters 23 and 24, and three registers 22, 25 and 26.

The input of the device 5 is constituted by a data input of the register 22 and a first input of the subtracter 23. A second input of the subtracter 23 is connected to an output of the register 22. An output of the subtracter 23 is connected to a first input of the subtracter 24. A second input of the subtracter 24 is connected to an output of the counter 21. An output of the subtracter 24 is connected to a data input of the register 26. The register 22 has a zero reset input receiving a signal R3 supplied by the sequencer 4 and a clock input receiving a signal H3 supplied by the sequencer 4. The counter 21 has a zero reset input receiving a signal R2 supplied by the sequencer 4 and a clock input receiving a clock signal H2 supplied by an output of the sequencer 4.

The memories addresses pointer 20 has an output which constitutes the first output of the device 5, and which is connected to a data input of the register 25. An output of the register 25 constitutes the second output of the device 5. An output of the register 26 constitutes the third output of the device 5. The registers 25 and 26 each have a clock input receiving a clock signal H4 supplied by an output of the sequencer 4 and each have a validation input receiving a validation signal VAL supplied by an output of the sequencer 4. The pointer 20 has two control inputs respectively receiving a zero reset signal R1 and a clock signal H1, respectively supplied by two outputs of the sequencer 4. The connections between the outputs of the sequencer 4 and the elements constituting the address computing devices 5, 6 and 7 have not been shown in the figure.

The sequencer 4 controls all the elements of the encoding device to carry out the series of steps of the encoding method. The sequencer 4 is synchronized with the arrival of the cosine transformation coefficients to be encoded by means of the synchronization signal applied to the input connection 15. This synchronization signal includes a pulse for each coefficient to be encoded. It is also used by the absolute addresses counter 1 in order to count the coefficients to be encoded and to thus produce the series of absolute address values ADA corresponding to the order of coefficients applied to input connection 14. Each absolute address value ADA is applied to the input of the address computing devices 5, 6 and 7. One of the devices 5 to 7 is controlled by the sequencer 4 according to the class of coefficients to be encoded in order to determine a transmitted address value, ADT, as a function of ADA.

Each coefficient to be encoded, K, is applied to the class selection circuit 2, in order to determine the number of significant bit of this coefficient and to supply a binary word CL representing the of significant bit number. The zero coefficients are allocated to an imaginary class No 0, the value CL is then 0. The binary word CL is applied to the sequencer 4 in order that it may validate one of the address computing devices 5, 6 or 7, corresponding to the class of the coefficient to be encoded. It is also applied to the write address input of the memories 8 and 9 in order to validate a single page of memory in the memory 8 and a single page of memory in the memory 9. Finally, it is applied to an input of the device 3 in order that it may eliminate the most significant bit in the binary word representing the coefficient to be encoded K. The thus modified binary word, K', is then stored in the memory 8, in the page selected by CL at a write address supplied by the address computing device which is validated by the sequencer 4. Its transmitted address ADT is simultaneously stored in the memory 9 at the same address.

For example, if the coefficient to be encoded, K, comprises the third significant bit, the sequencer 4 receives a binary word CL having the value 3 and it validates the address computing device 6 which corresponds to the class No 3. The device 6 supplies to the write address input of the memories 8 and 9 an address complement enabling the writing of the binary word K' in the memory 8 and of the transmitted address ADT in the memory 9. The writing is controlled by the clock signal H6 supplied by the sequencer 4. The write address is determined by the pointer 20 which counts the number of memory locations which are occupied in the memory page 83 corresponding to the class No 3 in the memory 8 and in the memory 9. The pointer 20 is initialized at the start of each block of coefficients to be encoded by the zero reset signal R1. It is incremented, during each writing, by the clock signal H1. The value P3 counted by the pointer 20 is supplied on the one hand to an input of the sequencer 4 and, on the other hand, to an input of the register 25. It is stored in the register 25 under the action of the clock signal H4. The sequencer 4 supplies the validation signal VAL in order to validate the output of the register 25 and to thus supply a write address to the memory 8 and to the memory 9.

The register 22 and the subtracter 23 enable the computation of a relative address ADR from an absolute address ADA. The register 22 is reset to zero by the signal R3 at the start of each block of coefficients to be encoded. It stores the absolute address value of the previous coefficient having been encoded and belonging to the class No 3. The sequencer 4 supplies it with the signal H3 at the end of the operation of encoding each coefficient belonging to the class No 3 in order to refresh the value which is stored in the register 22. The counter 21 is reset to zero by the signal R2 at the start of each block of coefficients to be encoded and at the end of the encoding of each coefficient belonging to the class No 3. It is incremented by unity by the signal H2 during the encoding of a coefficient belonging to the class No 1 or of a coefficient belonging to the class No 2. Thus it supplies the value of the variable C3 which counts the coefficients encoded in the classes No 1 and 2, from the instant at which the previous coefficient belonging to the class No 3 was encoded.

The subtracter 24 computes the difference between ADR and C3 in order to supply a transmitted address ADT. This value is stored in the register 26 under the action of the clock signal H4 and then it is supplied to the data input of the memory 9 when the register 26 receives the validation signal VAL. The transmitted address value is stored in the memory 9, at the same time that the truncated value K' of the coefficient is stored in the memory 8, under the action of a write control signal H6 which is supplied to it by the sequencer 4.

The non-zero coefficients belong to the imaginary class No 0 which does not give rise to any of the previously described operations. Nothing is stored in the memories 8 and 9.

The address computing device 7 for class No 1 does not comprise any counter 21 nor subtracter 24 since the variable C1 corresponding to C2 and C3 has a value which is always zero.

When the absolute address value ADA reaches 64, this signifies that all of the coefficients of a block of $8 \times 8$ coefficients have been processed. The values P1, P2 and P3 are then respectively equal to the numbers of the coefficients in the classes No 1, No 2 and No 3. The sequencer 4 detects that the value ADA is equal to 64. It then knows the number P1, P2, P3 of the coefficients in each class. It then commands a series of readings from the memories 8 and 9 in order to transmit the non-zero coefficients with the corresponding transmitted addresses. The sequencer 4 controls a reading from the memory 8 and the memory 9, class by class, from class No 1 to class No 3. The sequencer 4 supplies a series of read addresses from address 1 to address P1 in the page corresponding to the class No 1, then from address 1 to address P2 in the page corresponding to the class No 2, and then from address 1 to address P3 in the page corresponding to the class No 3.

Each reading is controlled by a read clock signal H5 which the sequencer 4 supplies to the memories 8 and 9. The memory 8 therefore supplies the value K' of a coefficient which has its most significant bit removed to the device 12. The memory 9 supplies a transmitted address value ADT to the Huffman encoder 10. The separators generator 11 supplies an inter-block separator pattern at the start of the encoding of each block. Then it supplies an inter-class separator pattern before the transmission of the coefficients and addresses of each class. The device 12 is a conventional parallel-serial conversion device enabling the transmission of all of these data in serial form at a constant rate. The embodiment of the encoder 10, the generator 11 and the device 12 is conventional and within the scope of those skilled in the art.

Figure 8:
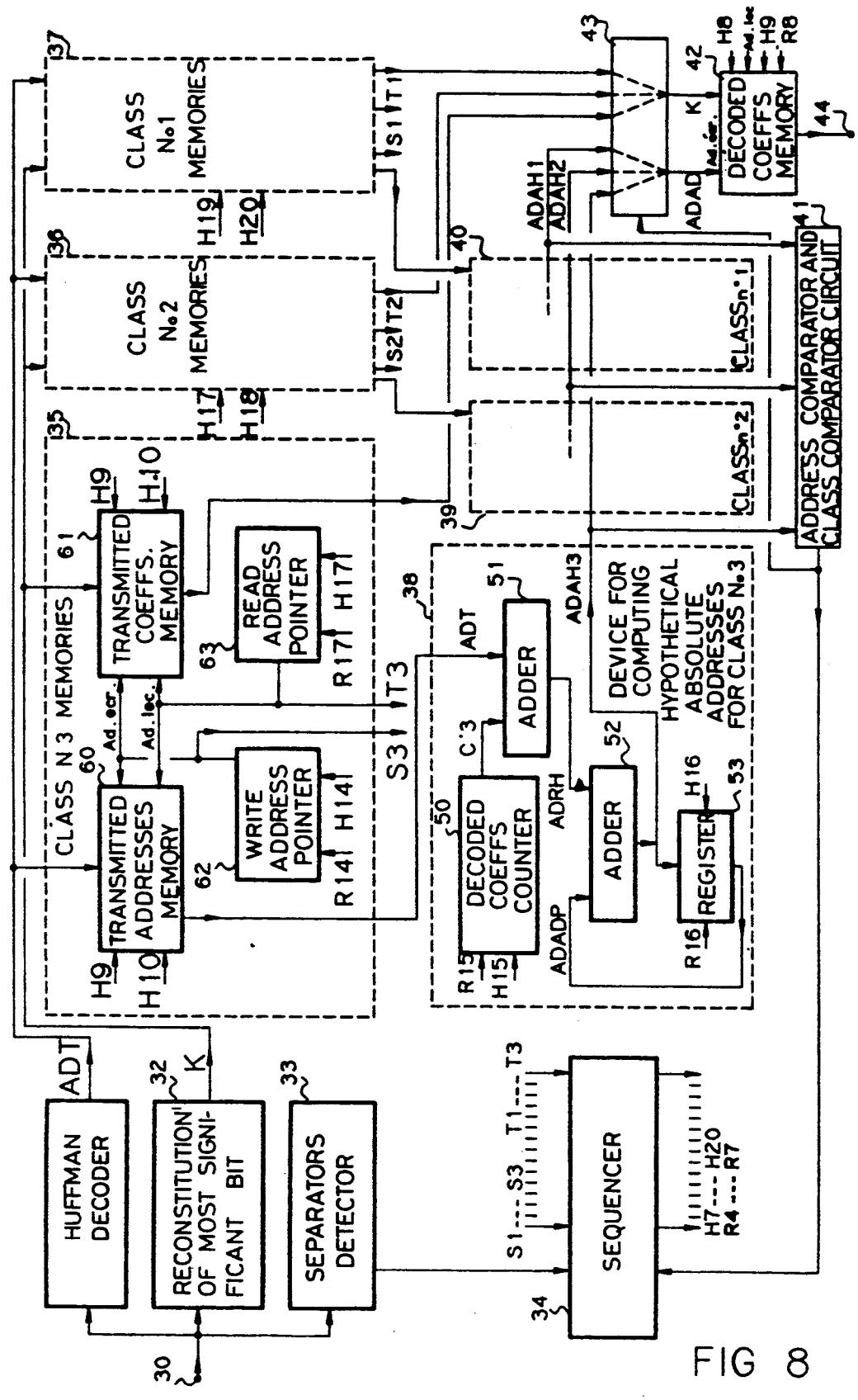
FIG. 8 shows the block diagram of an embodiment of the decoding device according to the invention.

FIG. 8 is the block diagram of an embodiment of a decoding device for the implementation of the method according to the invention. This embodiment comprises: an input connection 30 receiving, in serial form, a series of cosine transformation coefficients encoded by the method according to the invention, each of the transmitted coefficients being accompanied by a transmitted address, and being separated by inter-block separators and inter-class separators; a Huffman decoder 31; a device 32 for the reconstitution of the most significant bit; a separators detector device 33; a sequencer 34; three sets of memories 35, 36 and 37 respectively corresponding to classes No 1, No 2, and No 3 ; three hypothetical absolute address computing devices 38, 39 and 40; a circuit 41 for comparing addresses and classes; a memory 42; a multiplexer 43 having six inputs and two outputs; and an output connection 44 constituting the output of the decoding device.

The sets of memories 35, 36 and 37 have similar structures. For example the set of memories 35 for the class No 3 comprises: a transmitted addresses memory 60; a transmitted coefficient memory 61; a write addresses pointer 62 having one output connected to a write address input of the memories 60 and 61; and a read addresses pointer 63 having an output connected to a read address input of the memories 60 and 61. The pointers 62 and 63 each have a zero reset input connected to an output of the sequencer 34 by a link which is not shown, and receive the control signals R14 and R17 respectively. They also have clock inputs connected to outputs of the sequencer 34 by links which are not shown and respectively receive the clock signals H14 and H17.

The outputs of the pointers 62 and 63 are respectively connected to two inputs of the sequencer 34, by links which are not shown, in order to supply it respectively with the value S3 of the write address and with the value T3 of the read address in the set of memories 35. Similarly, the set of memories 36 is connected to two inputs of the sequencer 34 in order to supply it with the value S2 of the write address and the value T2 of the read address in this set of memories 36; and the set of memories 37 is connected to two inputs of the sequencer 34 in order to supply it with the value S1 of the write address and the value T1 of the read address in this set of memories 37.

The separators detector 33 has an output connected to an input of the sequencer 34 in order to supply it with a logic signal when it detects an inter-block separator, and a logic signal when it detects an inter-class separator.

The decoder 31, the device 32 and the detector 33 each have an input connected to the input connection 30 of the decoding device. The decoder 31 has an output connected to a data input of the memory 60 and to a data input of the memories similar to the memory 60 for class No 2 and class No 1. The decoder 31 supplies a transmitted address ADT for each Huffmannn code word which it receives. The device 32 has an output connected to a data input of the memory 61 and to a data input of the memories similar to the memory 61 for class No 2 and for class No 1. The device 32 supplies them with the value K of a coefficient where the most significant bit is reconstituted. The writing into the memories 60 and 61 is performed simultaneously under the control of a clock signal H9 supplied by an output of the sequencer 34. The reading in the memories 60 and 61 is carried out simultaneously under the control of a clock signal H10 supplied by an output of the sequencer 34.

The sets of memories 36 and 37 are controlled in a similar way by the write clock signals H17 and H19, and read clock signals H18 and H20, respectively for the coefficients belonging to the class No 2 and for those belonging to the class No 1.

During the transmission of the coefficients of the class No 3 for example, the value ADT of the transmitted addresses and the values K of the reconstituted coefficients are respectively written into the memories 60 and 61 as they are transmitted, at addresses S3 supplied by the write addresses pointer 62, incremented by the clock signal H14. The signal H14 is supplied by the sequencer 34 until the separators detector 33 detects the end of the encoded data corresponding to the class No. 3. Then the sequencer 34 controls the set of memories 36 in order to store the encoded data corresponding to the class No 2. Then it controls the set of memories 37 in order to store the encoded data corresponding to the class No 1. Finally, the detector 33 detects the end of the encoded data corresponding to a block and the actual decoding then begins.

The devices 38, 39 and 40 determine respectively three hypothetical absolute addresses ADAH3, ADAH2, and ADAH1 respectively for the first coefficient transmitted in each of the classes. In order to decode a coefficient, the sequencer 34 controls the incrementation of the read addresses pointer 63 and of its homologous pointers, then controls a reading in the memories 60 and 61 and in the homologous memories. At each instant, the pointer 63 indicates the address T3 at which the first coefficient not yet decoded in the class No 3 is stored. The pointer 63 not being incremented when hypothetical absolute address value ADAH3 is not validated as a definitive absolute address, it therefore continues to supply the same read address value T3, denoting the same coefficient not yet decoded, for the decoding of a next coefficient.

The sequencer 34 stops incrementing the pointer 63, and the homologous pointers respectively, when the read address value T3 has reached the last value of write address S3 ; and respectively when the read address value T2 has reached the last write address value S2, and respectively when the read address value T1 has reached the last write address value S1. When all of the stored coefficients have been actually decoded, the memory sets 35 to 37 are available for the decoding of a next block of coefficients.

The memory 60 has an output connected to an input of the device 38 for computing hypothetical absolute addresses, for class No 3. Similarly the homologous memories for the class No 2 and for the class No 1 each have an output connected to an input of the devices 39 and 40 respectively. An output of the memory 61 is connected to an input of the multiplexer 43. Similarly an output of the homologous memory for the class No 2 and an output of the homologous memory for the class No 1 are respectively connected to two other inputs of the multiplexer 43. The multiplexer 43 selects a value of coefficient K supplied by one of these three outputs and transmits it on its first output which is connected to a data input of the memory 42.

The device 38 for computing hypothetical absolute addresses for the class No 3 comprises: a decoded coefficients counter 50; two adders 51 and 52; and a register 53. A first input of the adder 51 is connected to the input of the device 38. A second input of the adder 51 is connected to an output of the counter 50. A first input and a second input of the adder 52 are respectively connected to an output of the adder 51 and to an output of the register 53. An output of the adder 52 is connected to the output of the device 38 and to a data input of the register 53. The counter 50 has a zero reset input receiving a signal R15 supplied by the sequencer 34 at the start of the decoding of each block and each time that a coefficient of the class No 3 has been decoded.

Another input of the counter 50 receives a clock signal H15 supplied by the sequencer 34 in order to increment its content by unity each time that a coefficient is decoded in one of the classes No 1 and No 2.

The counter 53 therefore supplies the value of the variable C'3 to the adder 51. The latter receives a transmitted address value ADT. The adder 51 then computes a hypothetical relative address value ADRH. The latter is added to an absolute address value ADADP which is the definitive absolute address of the previous coefficient decoded in the class No 3. This address is supplied by the output of the register 53 which has the function of storing the last definitive absolute address value computed for a coefficient of the class No 3. The register 53 comprises a zero reset input receiving a signal R16 supplied by the sequencer 34 at the start of decoding of each block, and a clock input receiving a clock signal H16 supplied by an output of the sequencer 34 when the hypothetical absolute address ADAH3 supplied by the device 38 is validated as a definitive absolute address.

An output of the device 38, a homologous output of the device 39 and a homologous output of the device 40 are respectively connected to three inputs of the multiplexer 43. The multiplexer 43 transmits a hypothetical absolute address value, supplied to one of its three inputs, to its second output which is connected to a write addresses input of the memory 42. These three outputs of the devices 38, 39 and 40 are also connected to three inputs of the comparator circuit 41. An output of the comparator circuit 41 is connected to a control input of the multiplexer 43 and to an input of the sequencer 34. An output of the memory 42 is connected to the output connection 44 which constitutes the output of the decoding device. The memory 42 furthermore possesses a read addresses input, a read clock input, a write clock input and a zero reset input, respectively connected to four outputs of the sequencer 34 by links which are not shown.

The devices 38, 39 and 40 respectively supply three hypothetical absolute address values ADAH3, ADAH2 and ADAH1, to the comparator circuit 41. These values are compared by the circuit 41 which supplies on its output a binary word V representing the number of the class for which the hypothetical absolute address is the smallest. In the case of equality between several hypothetical addresses, the comparator 41 also compares the numbers of the classes corresponding to the hypothetical absolute addresses which are equal. The address thus selected is considered as valid in order to constitute a definitive absolute address. This binary word V controls the multiplexer 43 such that it transmits the hypothetical absolute address and the value of the coefficient corresponding to the class for which the address is validated. The multiplexer 43 then supplies the value K of a decoded coefficient and a definitive absolute address value ADAD to the memory 42. The sequencer 34 supplies to the write clock input of the memory 42 a signal H11 after the validation of the address ADAD in order to store the coefficient K at the address ADAD.

The memory 42 has a zero reset input receiving a zero reset signal R8 supplied by the sequencer 34 at the start of the encoding of each block, in order to reset to zero all of the memory locations of the memory 42. The zero coefficients are neither transmitted nor decoded, on the contrary they are reconstituted in the memory 42 as the corresponding memory locations contain a zero value.

At the end of the decoding of a block, the sequencer 34 supplies to the read addresses input of the memory 42 a series of consecutive read addresses and it supplies to its read clock input a series of clock signals H12 in order to restitute, on the output connection 44, the series of cosine transformation coefficients of a block in the order in which they were supplied to the input of the encoding device.

The extent of the invention is not limited to the examples of devices described above. Numerous variants are within the scope of those skilled in the art. The applications of the encoding method according to the invention are not limited to the field of image compression. This method is applicable to any kind of blocks of data words, in particular when their probabilities of appearance do not have a statistical distribution enabling the advantageous use of a Huffman encoding.

We claim:

1. A method for encoding blocks of data words, each block having a fixed number of data words with a maximum of n bits, a position of a data word within a block being diagonally identified by a series of absolute addresses having consecutive values, the encoding method comprising the steps of:

classifying data words into n classes, an ith class, where i=1 to n, includes data words having as their most significant non-zero bit their ith bit;

computing a relative address for each classified data word by subtracting from an absolute address of a classified data word an absolute address of a data word in the class of the classified data word previously encoded; and determining a transmitted address for each classified data word by subtracting from a relative address of a classified data word a number of data words in classes less than the class of the classified data word which have been encoded since a previous encoding of a data word in the class of the classified data word; thereby encoding the classified data word.

2. An encoding method according to claim 1, further comprising the step of:

transmitting class by class and in an order of increasing absolute addresses within each class, encoded data words and their corresponding transmitted addresses, the encoded data words of each ith class having their ith and greater bits omitted from transmission, the transmitted addresses being encoded according to a variable length code.

3. An encoding method according to claim 2, wherein in the steps of transmitting class by class, the encoded data words and corresponding transmitted addresses of one class are distinguished from those of another class by transmitting for each class of encoded data words a binary inter-class separator word, which is unique with respect to any licit concatenation of encoded data words and transmitted addresses.

4. An encoding method according to claim 2, wherein in the step of transmitting class by class, the encoded data words and corresponding transmitted addresses of one class are distinguished from those of another class by transmitting for each class a binary count word representing a number of encoded data words to be transmitted.

5. A method for decoding encoded data words and their corresponding transmitted addresses into reconstituted blocks of data words, each block having a fixed number of data words with a maximum of n bits, a position of a data word within a block being diagonally identified by a series of absolute addresses having consecutive values, the decoding method comprising the steps of:

determining the class of an encoded data word;

storing class by class the encoded data words and corresponding transmitted addresses;

reconstituting the ith and greater bits of each encoded data word to reconstitute the value of each encoded data word;

reconstituting an absolute address of each encoded data word from a corresponding transmitted address, the step of reconstituting an absolute address comprising the steps of:

computing a hypothetical relative address for an encoded data word, in each class, which is to be decoded next, by adding the transmitted address of an encoded data word to be decoded to a number of encoded data words in classes less than the class of the encoded data word to be decoded which have been decoded since a previous decoding of an encoded data word in the class of the encoded data word to be decoded, computing a hypothetical absolute address for an encoded data word, in each class, which is to be decoded next, by adding the hypothetical relative address of an encoded data word to be decoded to the absolute address of a previously decoded encoded data word in the class of the encoded data word to be decoded, and selecting as a reconstituted absolute address a hypothetical absolute address having a minimum value from the hypothetical absolute addresses of the encoded data word, in each class, to be decoded next; and reconstituting a block of data words based on the reconstituted values of encoded data words and corresponding reconstituted absolute addresses, and by inserting zero value data words at absolute addresses in the block having no corresponding reconstituted encoded data word.

6. A method of decoding according to claim 5, wherein in the step of selecting a hypothetical absolute address, if more than one hypothetical absolute address is a minimum, then the hypothetical absolute address corresponding to the encoded data word in the lowest class is selected as the reconstituted absolute address.

7. A method for encoding and decoding blocks of data words, each block having a fixed number of data words with a maximum of n bits, a position of a data word within a block being diagonally identified by a series of absolute addresses having consecutive values, the encoding and decoding method comprising the steps of:

encoding data words for transmission comprising the steps of:

classifying data words into n classes, an ith class, where i=1 to n, includes data words having as their most significant non-zero bit their ith bit;

computing a relative address for each classified data word by subtracting from an absolute address of a classified data word an absolute address of a data word in the class of the classified data word previously encoded;

determining a transmitted address for each classified data word by subtracting from a relative address of a classified data word a number of data words in classes less than the class of the classified data word which have been encoded since a previous encoding of a data word in the class of the classified data word, thereby encoding the classified data word; and transmitting class by class and in an order of increasing absolute addresses within each class, encoded data words and their corresponding transmitted addresses, the encoded data words of each ith class having their ith and greater bits omitted from transmission, the transmitted addresses being encoded according to a variable length code;

decoding the transmitted encoded data words to reconstitute the blocks of data words comprising the steps of:

determining the class of an encoded data word;

storing class by class the encoded data words and corresponding transmitted addresses;

reconstituting the ith and greater bits of each encoded data word to reconstitute the value of each encoded data word;

reconstituting an absolute address of each encoded data word from a corresponding transmitted address, the step of reconstituting an absolute address comprising the steps of:

computing a hypothetical relative address for an encoded data word, in each class, which is to be decoded next, by adding the transmitted address of an encoded data word to be decoded to a number of encoded data words in classes less than the class of the encoded data word to be decoded which have been decoded since a previous decoding of an encoded data word in the class of the encoded data word to be decoded, computing a hypothetical absolute address for an encoded data word, in each class, which is to be decoded next, by adding the hypothetical relative address of an encoded data word to be decoded to the absolute address of a previously decoded encoded data word in the class of the encoded data word to be decoded, selecting as a reconstituted absolute address a hypothetical absolute address having a minimum value from the hypothetical absolute addresses of the encoded data word, in each class, to be decoded next; and reconstituting a block of data words based on the reconstituted values of encoded data words and their corresponding reconstituted absolute addresses, and by inserting zero value data words at absolute addresses in the block having no corresponding reconstituted encoded data word.

8. An apparatus for encoding blocks of data words, each block having a series of data words comprising a maximum of n bits, the apparatus comprising:

means for determining a most significant non-zero bit in each data word;

n first memory means for storing in an ith first memory, where i=1 to n, i-1 th and lower bits of data words determined to have as their most significant non-zero bit their ith bit;

means for computing an absolute address for each data word based on a position of a data word in a block;

means for computing a relative address for each data word stored in the n first memory means, by subtracting from the absolute address of a stored data word the absolute address of a data word previously stored in the same ith first memory means;

means for counting the number $(C_i)$ of data words stored in each of the 1 to i-1 first memory means since a previous storage of a data word in the ith first memory means;

means for computing a transmitted address for each stored data word by subtracting from the relative address of a data word stored in the ith first memory means the number $(C_i)$; and n second memory means for storing the transmitted addresses of the corresponding data words stored in the n first memory means.

9. An encoding apparatus according to claim 8, further comprising:

means for successively reading each stored data word and corresponding stored transmitted address from the n first and second memory means; and means for transmitting the read data words and corresponding read transmitted addresses, the read transmitted addresses being encoded according to a variable length code.

10. An apparatus for decoding blocks of encoded data words, the decoding apparatus receiving a series of encoded data words having their most significant non-zero bit and greater bits omitted, the decoding apparatus receiving transmitted addresses, encoded according to a variable length code, corresponding to the encoded data words, the encoded data words being received in groups of encoded data words having an equal number of bits; the decoding apparatus comprising:

means for receiving the transmitted addresses and decoding the transmitted addresses according to a variable length code;

means for reconstituting the most significant non-zero bit and greater bits of each encoded data word;

n first memory means for storing the reconstituted data words, data words having as their most significant non-zero bit their ith bit being stored in the ith first memory means, where i ÷ 1 to n;

n second memory means for storing the decoded transmitted addresses corresponding the data words stored in the n first memory means;

means associated with the n first and second memory means for reconstituting an absolute address for each stored data word, the means for reconstituting:

counting a number $(C_i)$ of data words stored in each of the 1 to i-1 first memory means since a previous storage of a data word in the ith first memory means, computing a hypothetical relative address for a stored data word, in each n first memory means, which is to be read next, by adding the transmitted address of a stored data word to be read to the number $(C_i)$, computing a hypothetical absolute address for a stored data word, in each n first memory means, which is to be read next, by adding the hypothetical relative address of the stored data word to be read to the absolute address of a stored data word previously read from the same ith first memory means as the stored data word to be read, and selecting as a reconstituted absolute address a hypothetical absolute address having a minimum value from the hypothetical absolute addresses of the stored data words, in each n first memory means, to be read next; and means for reading from the n first memory means the stored data word corresponding to the reconstituted absolute address and storing the data word in a third memory means in order of increasing reconstituted absolute addresses to reconstitute a block of encoded data words.

* * * * *